United States Patent [19]

Zimmerman et al.

[11] Patent Number: 4,487,912

[45] Date of Patent: Dec. 11, 1984

[54] REACTION INJECTION MOLDED ELASTOMERS CONTAINING ACID AMIDES

[75] Inventors: Robert L. Zimmerman; Richard J. G. Dominguez, both of Austin, Tex.

[73] Assignee: Texaco Inc., White Plains, N.Y.

[21] Appl. No.: 579,236

[22] Filed: Feb. 13, 1984

[51] Int. Cl.³ .................. C08G 18/32; C08G 18/34; C08G 18/50

[52] U.S. Cl. ................ 528/52; 264/331.19; 264/300; 528/76; 528/77; 528/84

[58] Field of Search ................. 528/52, 76, 77, 84

[56] References Cited

U.S. PATENT DOCUMENTS

| | | | |
|---|---|---|---|
| 3,838,076 | 9/1974 | Moss et al. | 521/163 |
| 4,246,363 | 1/1981 | Turner et al. | 521/163 |
| 4,254,069 | 3/1981 | Dominguez | 521/914 |
| 4,269,945 | 5/1981 | Vanderhider et al. | 521/159 |
| 4,272,618 | 6/1981 | Dominguez et al. | 521/160 |
| 4,376,834 | 3/1983 | Goldwasser et al. | 521/160 |
| 4,379,100 | 4/1983 | Salisbury et al. | 521/110 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |

*Primary Examiner*—Herbert S. Cockeram
*Attorney, Agent, or Firm*—Jack H. Park; Kenneth R. Priem; David L. Mossman

[57] ABSTRACT

The invention relates to reaction injection molded elastomers derived from high molecular weight active hydrogen containing materials, a chain extender, a polyisocyanate and an acid amide as an internal mold release agent imparting superior hot tear strength. The reaction injection molded (RIM) elastomers of this invention are useful, for example, as automobile body parts.

19 Claims, No Drawings

REACTION INJECTION MOLDED ELASTOMERS CONTAINING ACID AMIDES

CROSS-REFERENCES TO RELATED APPLICATIONS

This application is related to Ser. No. 579,235; Ser. No. 579,234 and Ser. No. 579,231, all filed of even date.

BACGROUND OF THE INVENTION

1. Field of the Invention

This invention concerns the field of reaction injection molded elastomers.

2. Description of Other Publications in the Field

U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, low molecular weight hydroxyl terminated molecules; e.g., ethylene glycol, are disclosed. However, the actual examples are of polyether polyurethanes using polyols (hydroxyl terminated) of high molecular weight. The chain extenders, ethylene glycol and monoethanolamine, were used as crosslinkers.

U.S. Pat. No. 3,838,076 discloses foams made from amine terminated polyethers, wherein the amine termination ranges from 10 to 50 percent.

Turner's U.S. Pat. No. 4,246,363 claims a RIM polyurethane composition derived from using at least three different active hydrogen containing materials having specific relationships and reactivity and solubility parameters to one another. Examples 22 and 23 of Turner use JEFFAMINE ® D-2000, diethylene glycol and the reaction product of one mole of aminoethylethanolamine with three moles of propylene oxide.

U.S. Pat. No. 4,379,100 describes a polyurethane RIM process wherein the carboxyl functional dimethyl polysiloxane internal mold release agents mentioned hereinafter are used. See, for example, column 4, lines 34–43.

U.S. Pat. No. 4,396,729 describes RIM processes and materials made from high molecular weight amine terminated polyethers (used in this invention), amine terminated chain extenders, polyisocyanates and internal mold release agents such as, for example, those mentioned in U.S. Pat. No. 4,379,100.

U.S. Pat. No. 4,376,834 describes "polyurethane" materials prepared fom amine terminated polyethers, hydroxyl terminated chain extenders and polyisocyanates.

Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

SUMMARY OF THE INVENTION

The invention is a reaction injection molded (RIM) elastomer comprising a cured reaction product of ingredients comprising a high molecular weight active hydrogen containing material, a chain extender, an aromatic polyisocyanate and an acid amide. The invention is also a method of preparation of a RIM elastomer as described above.

DESCRIPTION OF THE PREFERRED EMBODIMENTS

The high molecular weight active hydrogen containing materials of this invention are of various types. Some examples of these materials are discussed below.

Amine terminated polyethers useful in this invention include primary and secondary amine terminated polyether polyols of at least 2,500 average molecular weight having greater than 50% of their active hydrogens in the form of amine hydrogens having from 2 to 6 functionality, preferably from 2 to 3. Mixtures of amine terminated polyethers may be used. In a preferred embodiment the amine terminated polyethers defined as above have an average molecular weight of at least 4,000. An especially preferred embodiment uses amine terminated polyethers defined as above with an average molecular weight of at least about 5,000.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups in the amine group. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared may then be reductively aminated as outlined, for example, in U.S. Pat. No. 3,654,370, which is incorporated herein by reference. Of course, other methods of preparing the amine terminated polyether resins described above may be used.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The polyols useful in the process of this invention include polyether polyols, polyester diols, triols, tetrols, etc., having an equivalent weight of at least 500, and preferably at least 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. In order to achieve the rapid reaction rates which are normally required for molding RIM polyurethane elastomers, it is perferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene).

The chain extenders useful in this invention include low molecular weight linear diols such as 1,4-butane diol, propylene glycol and ethylene glycol. Ethylene glycol is especially preferred. Other chain extenders, including cyclic diols such as 1,4-cyclohexane diol would also be suitable as chain extenders in the practice of this invention. These chain extenders may be used alone or in combination.

Aromatic amine terminated chain extenders useful in this invention include, for example, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainer being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi- prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

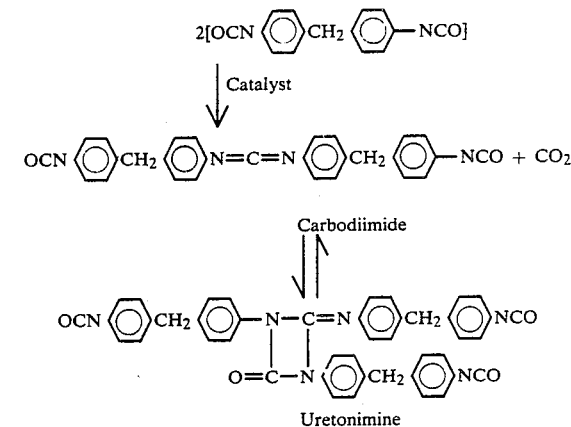

Examples of commercial materials of this type are Upjohn's ISONATE ® 125M (pure MDI) and ISONATE 143L ("Liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-yl-1,3-butanediamine.

The acid amides useful as internal mold release agents in the present invention include those having the following structures:

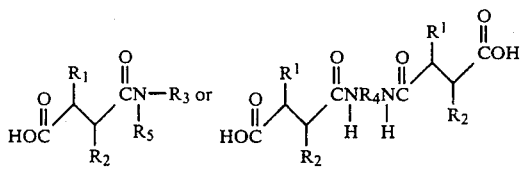

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$.

These acid amides may be used separately or in combination. An increase in hot tear strength is noticed when these materials are used. These acid amides may be prepared by the reaction of amines and anhydrides, for example:

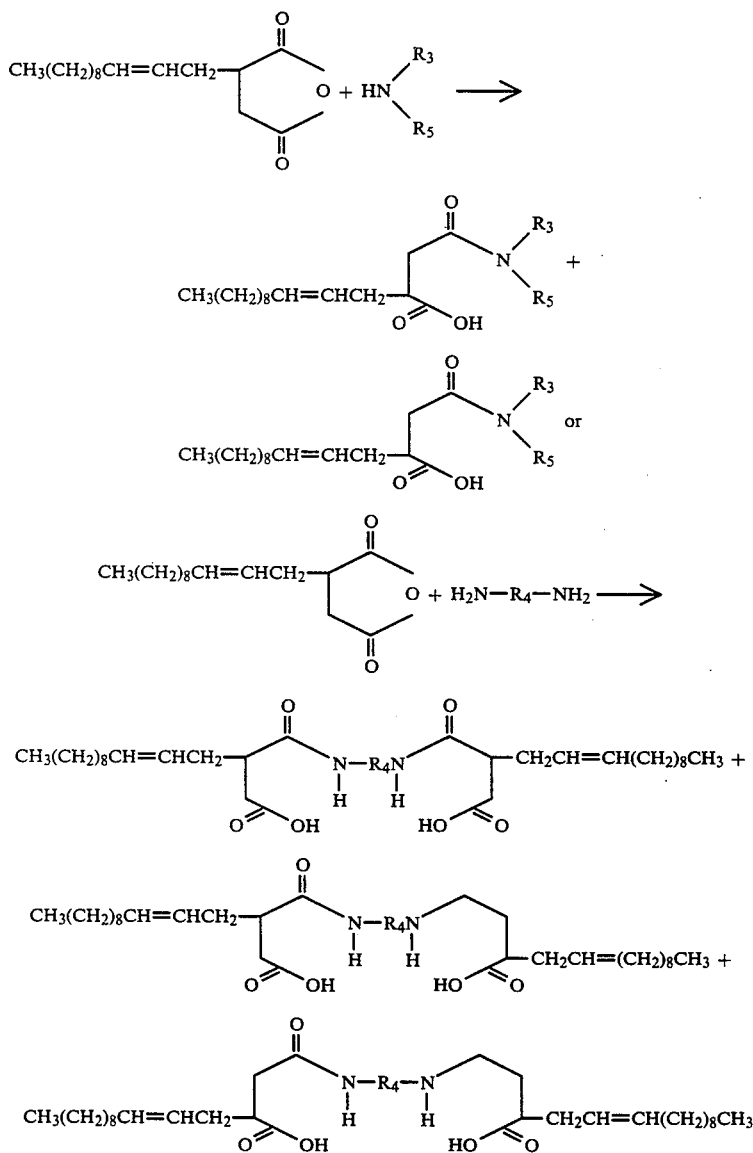

where the substituent groups are as defined above.

Examples of useful anhydrides are: succinic anhydride, dodecenyl succinic anhydride, octenyl succinic anhydride, pentenyl succinic anhydride, hexenyl succinic anhydride, diisobutenyl succinic anhydride, nonenyl succinic anhydride, decenyl succinic anhydride, hexadecenyl succinic anhydride, hexyl succinic anhydride, octyl succinic anhydride, decyl succinic anhydride, dodecyl succinic anhydride, hexadecyl succinic anhydride and octadecyl succinic anhydride. Preferred anhydrides are succinic anhydride, octenyl succinic anhydride, nonenyl succinic anhydride and dodecenyl succinic anhydride.

As the data will show, a synergistic effect on release properties is obtained when the acid amides of this invention are used in combination with carboxyl functional dimethyl polysiloxane internal release agents such as Q2-7119 from Dow-Corning Corporation. These mold release agents are described in U.S. Pat. No. 4,379,100, column 4, lines 34–43, which is incorporated herein by reference.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is desirable. Post curing will improve some properties such as heat sag. Employment of post curing depends on the desired properties of the end product.

The examples which follow exemplify the improvement obtained by the process of this invention. However, these examples are not intended to limit the scope of the invention.

EXAMPLE 1

Each of the example formulations which follow were processed on an Accuratio VR-100 high pressure impingement mixing RIM machine. The impingement mixing pressures were about 2,000 psi and the material was injected into a steel flat plaque mold after mixing. The mold is milled to produce plaques which are 18"×18"×⅛". The mold temperature is typically 150°–160° F.

| Formulation | |
| --- | --- |
| JEFFAMINE ® T-5000 | 32.2 |
| Diethyltoluene diamine | 13.5 |
| Internal mold release agent[1] | 0.5 |
| THANATE ® L-650 | 53.7 |
| Hot tear (lb) | 6.5 |
| Number of releases from mold before additional external mold release is required | 16 |

[1]Mixture of

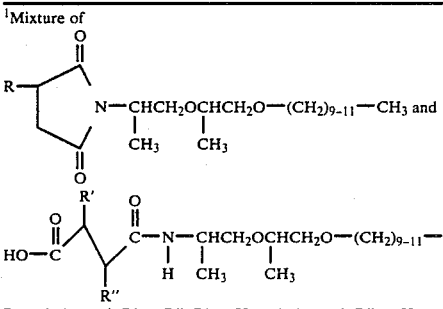

R = dodecenyl; R' ≠ R"; R' = H or dodecenyl; R" = H or dodecenyl

EXAMPLE 2

This example illustrates the improvement in hot tear and release of the RIM elastomer. The method was like Example 1.

| Formulation | A | B | C | D |
| --- | --- | --- | --- | --- |
| JEFFAMINE ® T-5000 | 31.86 | 31.69 | 31.69 | 31.69 |
| Diethyltoluene diamine | 13.36 | 13.29 | 13.29 | 13.29 |
| Internal mold release agent[1] | — | 0.5 | 1.0 | — |
| Dow Corning Q2-7119 | — | — | — | 0.5 |
| Code 231[2] | 54.78 | 54.78 | 54.78 | 54.78 |

| Formulation | A | B | C | D |
| --- | --- | --- | --- | --- |
| Hot tear (lb) | 5.9 | 8.1 | 9.0 | 6.1 |
| Number of releases from mold | 6 | 16+ | 22+ | 32 |

[1]Mold release as described in Example 1.
[2]See Glossary.
Column A is the control; no internal mold release agent is used.
Column D is the mold release used in U.S. Pat. No. 4,396,729.
Columns B and C which contain the mold release agent of this invention give improved hot tear when compared to A and D and improved number of releases when compared to A. While D gives more releases than A, B or C there is no improvement in hot tear over control A. The hot tear of D is less than either B or C.

Hot tear and the number of releases between applications of external release agent are very important processing properties in RIM systems.

EXAMPLE 3

This example shows the use of the mold release agent with hydroxyl terminated polyols in the preparation of a RIM elastomer. The method used was like Example 1.

| | |
| --- | --- |
| THANOL SF-5505 | 30.9 |
| Diethyltoluene diamine | 13.0 |
| Internal mold release agent[1] | 1.0 |
| Dibutyltin dilaurate | 0.15 |
| Code 231 | 55.1 |
| Number of releases | 32+ |
| Hot tear (lbs) | 8.8 |

After aging the B-component of this system for three days no difference in reactivity was observed. A similar B-component containing Q2-7119 lost reactivity.

EXAMPLE 4

The following example illustrates the synergism of a mold release combination in a RIM elastomer prepared using the method of Example 1.

| Formulation | A | B | C | D | E |
| --- | --- | --- | --- | --- | --- |
| JEFFAMINE ® T-5000 | 31.86 | 31.69 | 31.69 | 31.69 | 31.36 |
| Diethyltoluenediamine | 13.36 | 13.29 | 13.29 | 13.29 | 13.15 |
| Internal mold release agent[1] | — | 0.5 | 1.0 | — | 1.0 |
| Dow-Corning Q2-7119[2] | — | — | — | 0.5 | 0.5 |
| Code 231 | 54.78 | 54.78 | 54.78 | 54.78 | 54.78 |
| Hot tear (lb) | 5.9 | 8.1 | 9.0 | 6.1 | 10.9 |
| Number of releases | 6 | 16 | 22 | 32 | 130+ |

[1]Mixture of

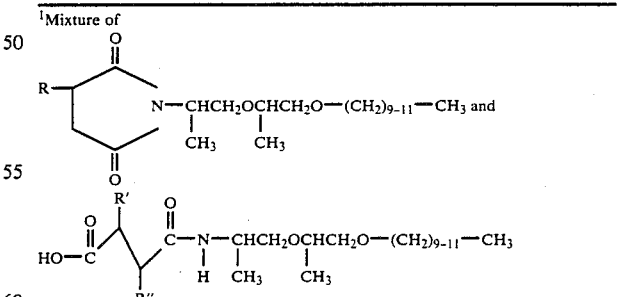

R = dodecenyl; R' ≠ R"; R' = H or dodecenyl; R" = H or dodecenyl
[2]A silicone surfactant containing carboxy groups sold by Dow-Corning as an internal mold release agent. See Glossary.

Column E which contains both internal mold release agents gives a greater hot tear than either release agent by itself (B, C, and D). This is larger than would be expected by an additive effect. Also column E gave much larger increase in the number of releases than would have been expected. Column A is a control sample with no internal mold release agent.

EXAMPLE 5

The following formulation used the release agent of this invention and the prior art release agent in the preparation of a RIM elastomer prepared as in Example 1.

| | |
|---|---|
| JEFFAMINE ® T-500 | 32.2 |
| Diethyltoluenediamine | 13.5 |
| Internal mold release agent[1] | 0.5 |
| Dow-Corning Q2-7119 | 0.5 |
| THANATE L65-0 | 53.7 |
| Number of releases | 38+ |

[1]See Example 4.

EXAMPLE 6

The following examples of RIM elastomer preparation used the following basic formulation with the additive as noted in each instance. The method of elastomer preparation was as in Example 1.

| Formulation | pbw |
|---|---|
| A-component | |
| JEFFAMINE T-5000 | 42.2 |
| Diethyltoluene diamine | 17.7 |
| B-component | |
| Code 231 isocyanate | 72.5 |

The additive in each case was added to the B-component.

| Additive A = | JEFFAMINE ® M-300 + dodecenyl succinic anhydride - 86 acid number | |
|---|---|---|
| pbw A | | Hot tear, lbs |
| 0 | | 5.9 |
| 0.7 | | 8.1 |
| 1.4 | | 9.0 |

| Additive B = | Same as Additive A except acid number = 100 | |
|---|---|---|
| pbw B | | Hot tear, lbs |
| 0 | | 5.9 |
| 1.4 | | 12 |
| 2.1 | | 10 |

The above experiments indicate that this additive increases the green strength of the RIM elastomer. It appears that there is a maximum at about 1.4 pbw of additive. When Q2-7119 is added the following results are obtained:

| pbw B | pbw Q2-7119 | Hot tear, lbs |
|---|---|---|
| 1.4 | 0.7 | 10 |
| 2.1 | 0 | 10 |
| 0 | 2.1 | 6.0 |

The above experiments indicate that at a total of 2.1 pbw additive, as long as 1.4 pbw is B. There is no green strength penalty when Q2-7119 is added. If the whole 2.1 parts of additive is Q2-7119, poor tear results. From the point of view of release, a synergism occurs as is indicated in the following:

Release

| pbw B | pbw Q2-7119 | Quality | No. of releases |
|---|---|---|---|
| 1.4 | 0.7 | best | 130 |
| 2.1 | 0 | good | 40 |
| 0 | 2.1 | better | 40 |

| Additive C = | JEFFAMINE M-300 + dodecenyl succinic anhydride taken to the imide - 30 acid number | |
|---|---|---|
| pbw C | | Hot tear |
| 1.4 | | 8.4 |
| 0 | | 7.0 |

Some enhancement in hot tear results, but because the acid number is lower than for the same material stopped at the amide-acid (A and B) the enhancement of the hot tear is less.

| Additive D = | JEFFAMINE D-2000 + octenyl succinic anhydride taken to the imide - 16 acid number | |
|---|---|---|
| pbw D | | Hot tear |
| 1.4 | | 7.2 |
| 0 | | 7.0 |

Since the amide-acid is taken to almost all imide low acid number), there is no enhancement of tear strength. It is, therefore clear that the amide-acid species is responsible for the hot tear improvement and as the material is taken to the imide, the hot tear enhancement disappears.

The same formulation as above was made into a RIM elastomer except that the acid number of the additive was 47.5. The hot tear was 10 as compared with 7 for the standard.

In the remaining runs the JEFFAMINE T-5000 was from a different lot and the supplier of the diethyltoluene diamine was different.

| Additive E = | Morpholine + dodecenyl succinic anhydride - 16 acid number | |
|---|---|---|
| pbw E | | Hot tear, lbs |
| 1.4 | | 11.5 |
| 0 | | 7 |

| Additive F = | Analine + dodecenyl succinic anhydride - 135 acid number | |
|---|---|---|
| pbw F | | Hot tear, lbs |
| 1.4 | | 10.6 |
| 0 | | 7 |

| Additive G = | JEFFAMINE M-300 + succinic anhydride - acid number 147 | |
|---|---|---|
| pbw G | | Hot tear, lbs |
| 1.4 | | 11.0 |
| 0 | | 7 |

All these additives improve the hot tear.

| | GLOSSARY |
|---|---|
| THANATE ® L55-0 or Code 231 | A quasi-prepolymer comprising 50 pbw THANOL ® SF-5505 |
| THANATE ® L65-0 | A quasi prepolymer comprising 50 pbw ISONATE ® 143L and 50 pbw of THANOL SF-6503. |
| ISONATE ® 13L | Pure MDI isocyanate modified so that it is a liquid at ambient temperatures. A product of the Upjohn Co. |
| JEFFAMINE ® T-5000 | Polypropylene oxide triamine of about 5,000 molecular weight. |
| JEFFAMINE ® M-300 | An aminated product of a 10–12 carbon atom linear primary alcohol |

| GLOSSARY | |
|---|---|
| | and 2 moles of propylene oxide. |
| JEFFAMINE ® D-2000 | Polypropylene oxide diamine of about 2,000 molecular weight. |
| THANOL ® SF-5505 | A 5,500 molecular weight polyether triol containing approximately 80% primary hydroxyl groups. |
| THANOL ® SF-6503 | A 6,500 molecular weight polyether triol containing approximately 80% primary hydroxyl groups. |
| Dow-Corning Q2-7119 | Carboxyl functional dimethylpolysiloxane release agent. A product of Dow-Corning. See U.S. Pat. No. 4,379,100, col. 4, lines 34–43. |

We claim:

1. A reaction injection molded elastomer comprising the reaction product of ingredients comprising a high molecular weight active hydrogen containing material, a chain extender, an aromatic polyisocyanate and an acid amide in an amount effective to provide improved mold release and hot tear properties.

2. An elastomer as in claim 1 wherein there is also present a carboxyl functional dimethyl polysiloxane release agent.

3. A reaction injection molded elastomer comprising the reaction product of ingredients comprising a high molecular weight active hydrogen containing material, a chain extender, an aromatic polyisocyanate and a compound represented by the formula:

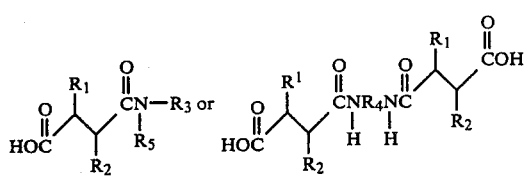

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

4. An elastomer of claim 3 wherein there is also present a carboxy functional dimethyl polysiloxane release agent.

5. A reaction injection molded elastomer comprising the reaction product of ingredients comprising primary or secondary amine terminated polyethers of at least 2,500 molecular weight having greater than 50% of their active hydrogens in the form of amine hydrogens, a chain extender, an aromatic polyisocyanate and an acid amide represented by the formula:

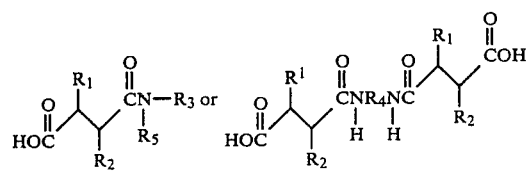

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

6. An elastomer as in claim 5 wherein the acid amide is made by reacting dodecenyl succinic anhydride with the aminated product of a 10–12 carbon atom linear primary alcohol and two moles of propylene oxide.

7. An elastomer of claim 5 wherein there is also present a carboxy functional dimethyl polysiloxane release agent.

8. An elastomer as in claim 5 wherein the chain extender is amine terminated.

9. A reaction injection molded elastomer comprising the reaction product of ingredients comprising a polyol, a chain extender, an aromatic polyisocyanate and an acid amide represented by the formula:

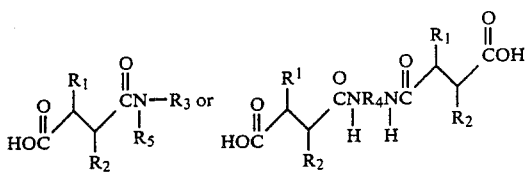

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

10. An elastomer as in claim 9 wherein the acid amide is made by reacting dodecenyl succinic anhydride with the aminated product of a 10–12 carbon atom linear primary alcohol and two moles of propylene oxide.

11. An elastomer of claim 9 wherein there is also present a carboxy functional dimethyl polysiloxane release agent.

12. A reaction injection molded elastomer comprising the reaction product of ingredients comprising primary or secondary amine terminated polyethers of at least 4,000 molecular weight having greater than 50% of their active hydrogens in the form of amine hydrogens, a chain extender, an aromatic polyisocyanate and an acid amide represented by the formula:

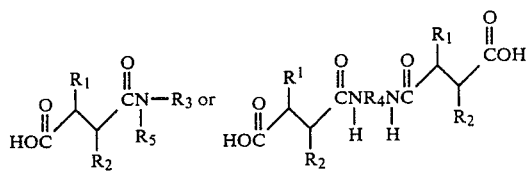

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

13. An elastomer as in claim 12 wherein the acid amide is made by reacting dodecenyl succinic anhydride with the aminated product of a 10–12 carbon atom linear primary alcohol and two moles of propylene oxide.

14. An elastomer of claim 12 wherein there is also present a carboxy functional dimethyl polysiloxane release agent.

15. An elastomer as in claim 12 wherein the chain extender is amine terminated.

16. A method for making a reaction injection molded elastomer comprising reacting in a closed mold ingredients comprising a high molecular weight active hydrogen containing material, a chain extender, an aromatic polyisocyanate and an acid amide in an amount effective to provide improved mold release and hot tear properties.

17. A method for making a reaction injection molded elastomer comprising reacting in a closed mold ingredients comprising a high molecular weight active hydrogen containing material, a chain extender, an aromatic polyisocyanate and a compound represented by the formula:

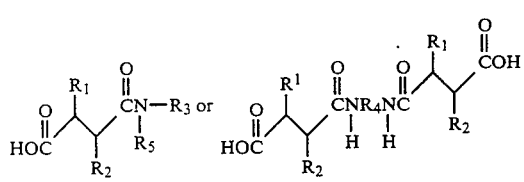

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

18. A method for making a reaction injection molded elastomer comprising reacting in a closed mold ingredients comprising primary or secondary amine terminated polyethers of at least 2,500 molecular weight having greater than 50% of their active hydrogens in the form of amine hydrogens, a chain extender, an aromatic polyisocyanate and an acid amide represented by the formula:

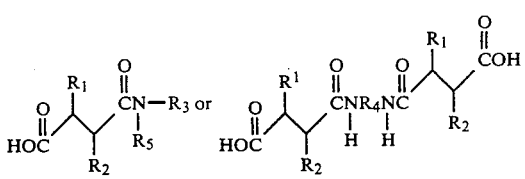

where $R_1$=H, alkyl, alkenyl; $R_2$=H, alkyl, alkenyl; $R_3$=alkyl, oxyalkyl, aryl, cyclic alkyl when combined with $R_5$; $R_4$=oxyalkyl and $R_5$=H, alkyl, oxyalkyl, cyclic alkyl when combined with $R_3$ in an amount effective to provide improved mold release and hot tear properties.

19. A method for making a reaction injection molded elastomer comprising reacting in a closed mold ingredients comprising a polyol, a chain extender, an aromatic polyisocyanate and an acid amide represented by the formula:

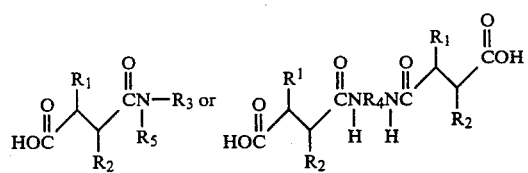

where $R_1$=H, alkyl, alkenyl; $R_2$=H, alkyl, alkenyl; $R_3$=alkyl, oxyalkyl, aryl, cyclic alkyl when combined with $R_5$; $R_4$ =oxyalkyl and $R_5$=H, alkyl, oxyalkyl, cyclic alkyl when combined with $R_3$ in an amount effective to provide improved mold release and hot tear properties.

* * * * *